April 13, 1937.  H. H. KELLER  2,076,728
BUILDING STRUCTURE
Filed March 29, 1933   10 Sheets-Sheet 4
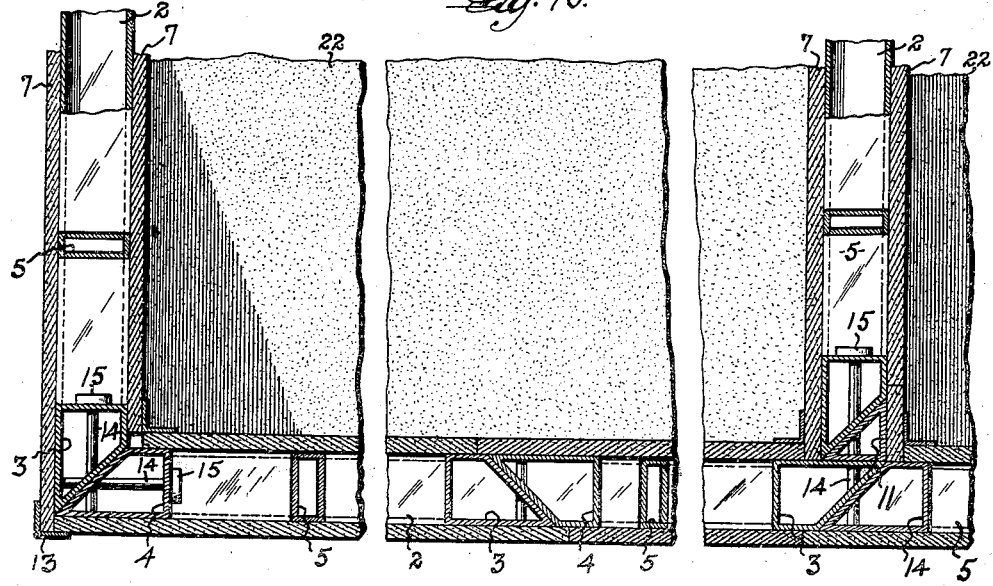
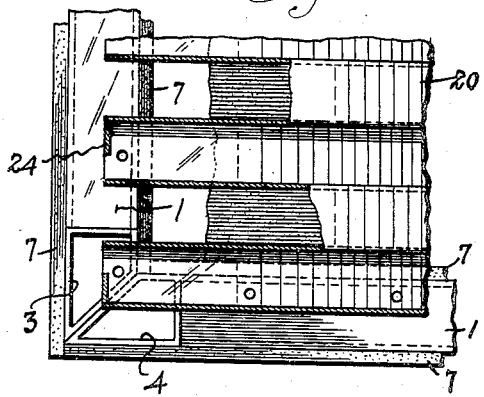
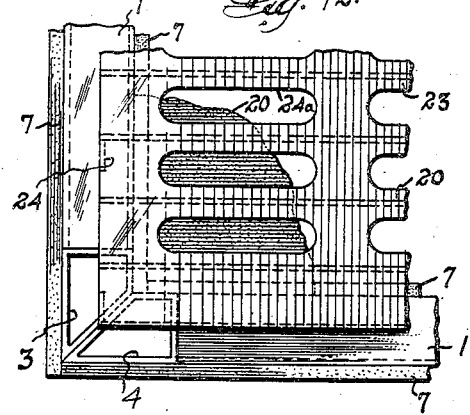
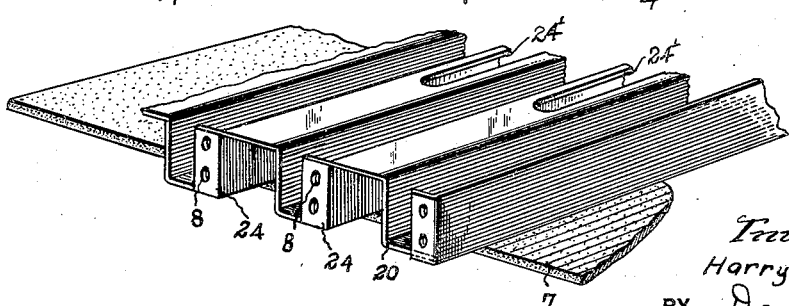
Inventor:
Harry H. Keller
BY Darby & Darby
Attorneys.

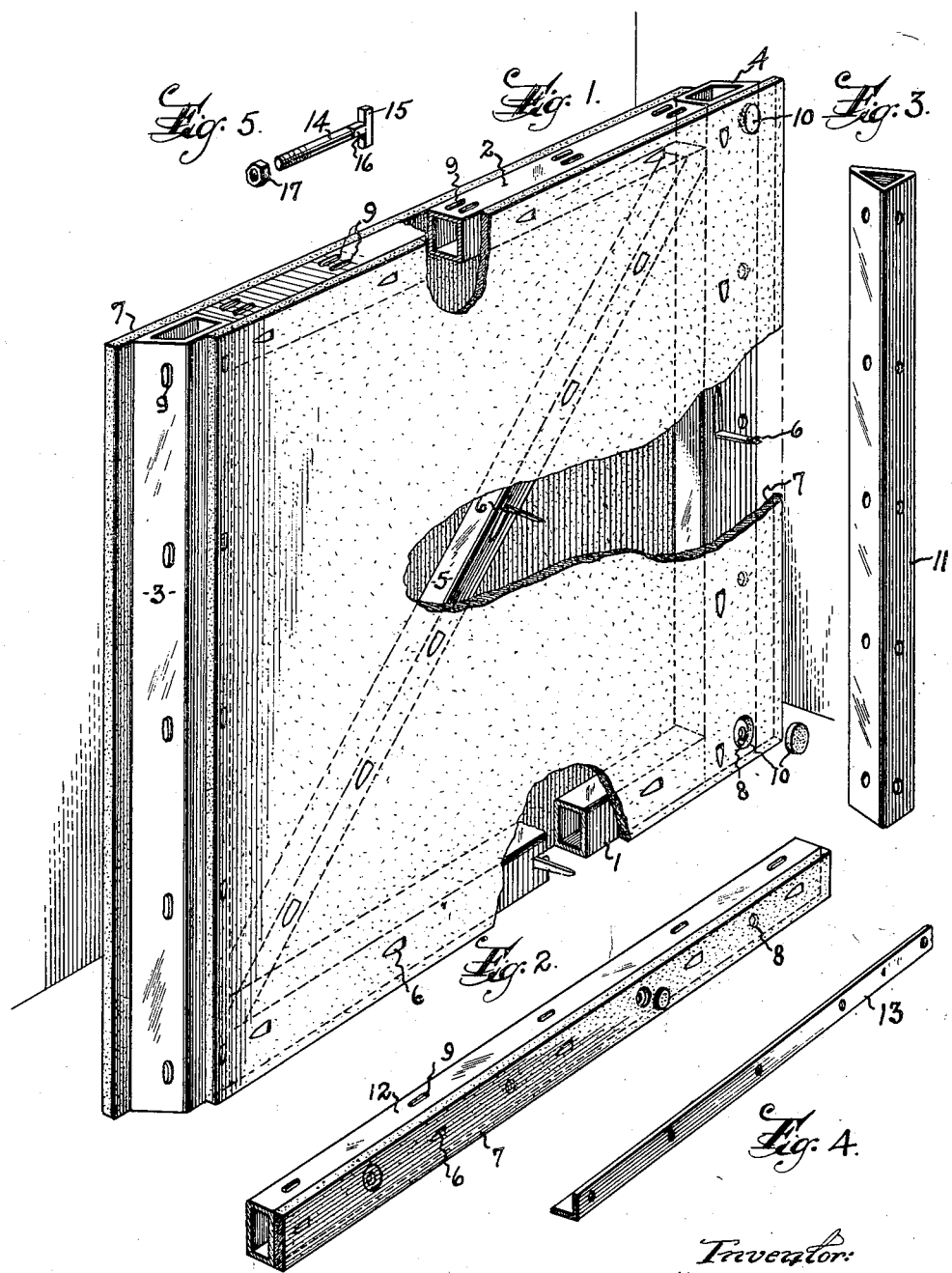

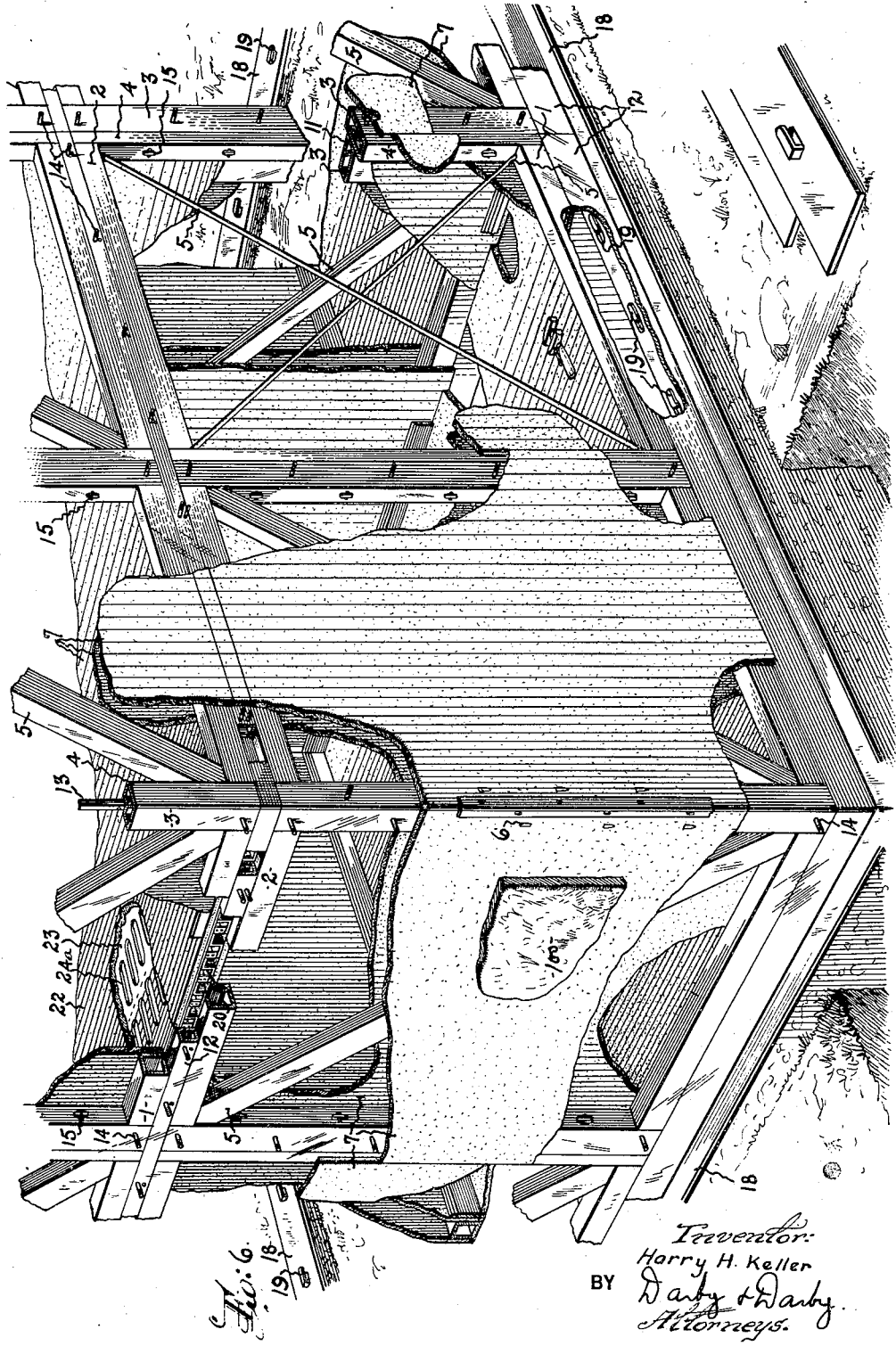

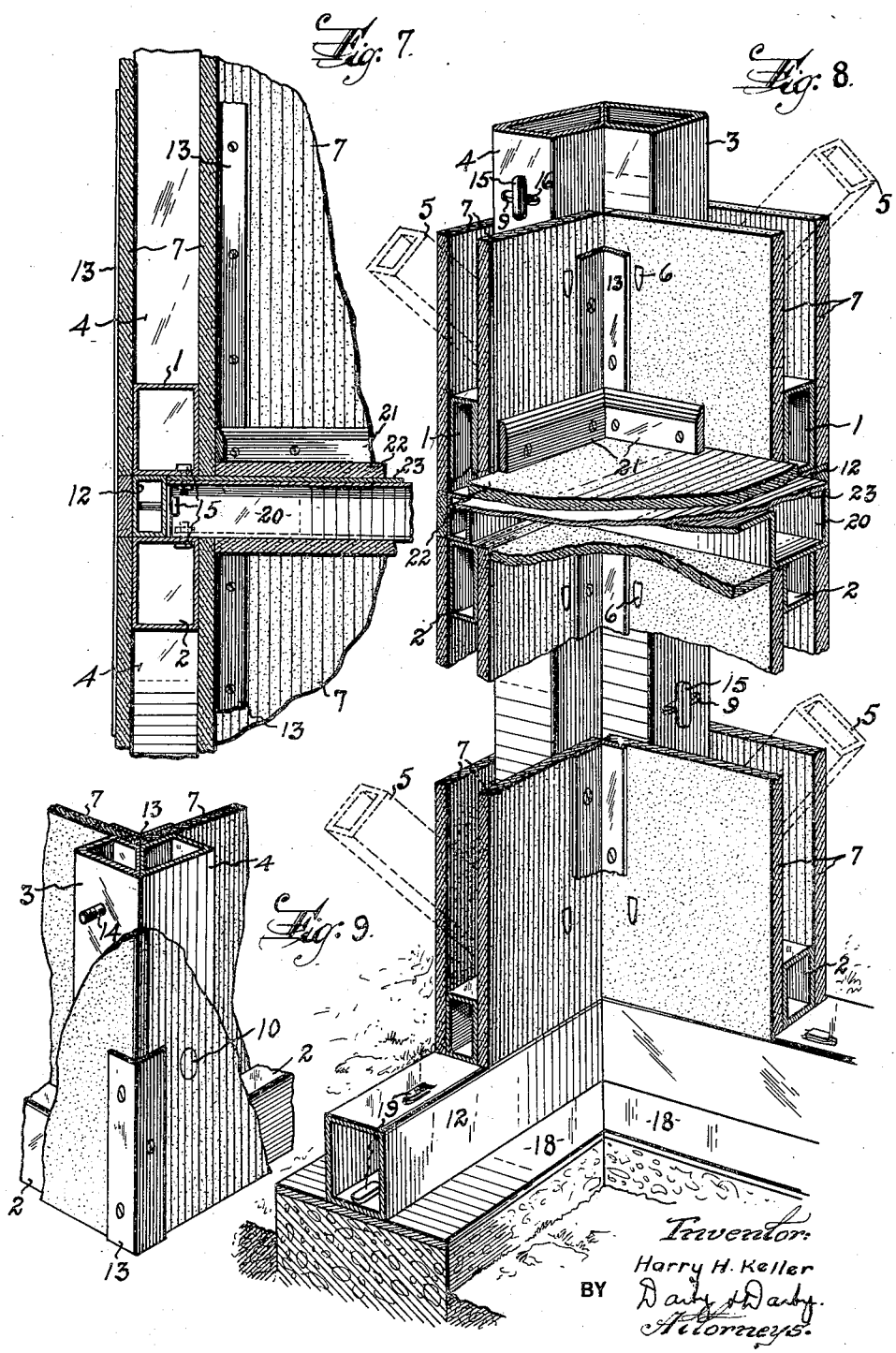

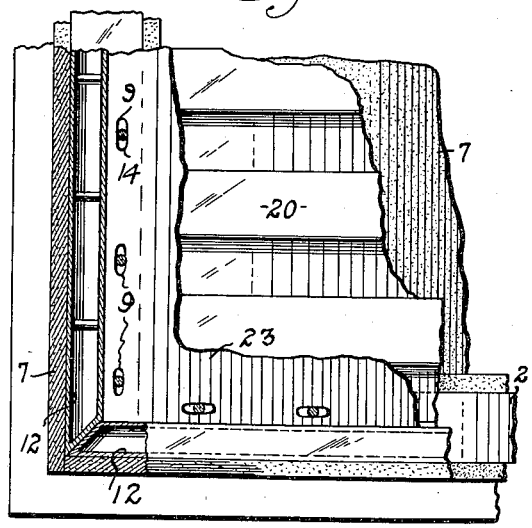
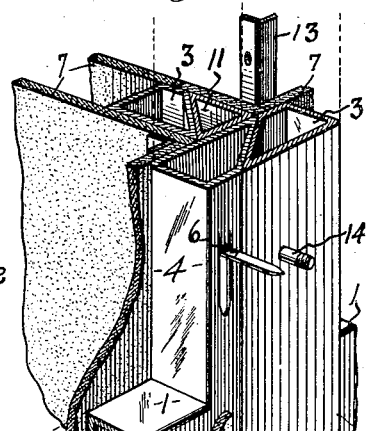
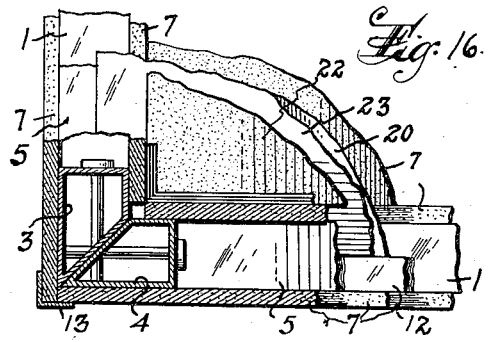
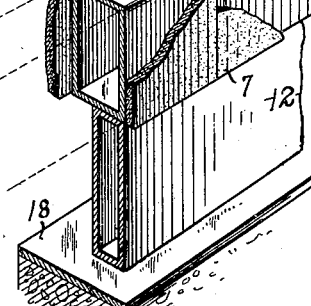
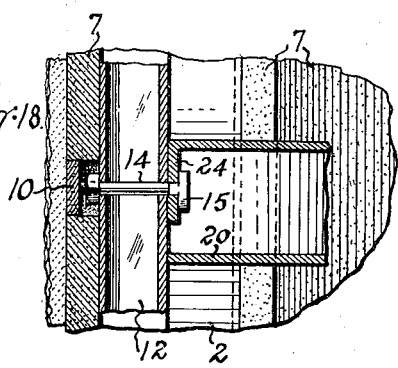
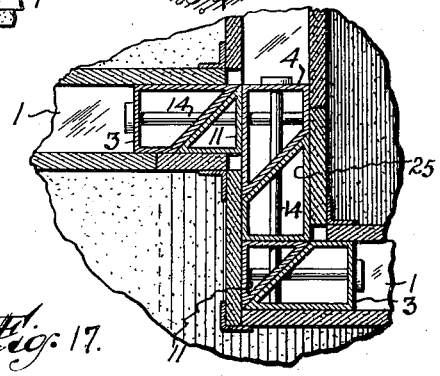

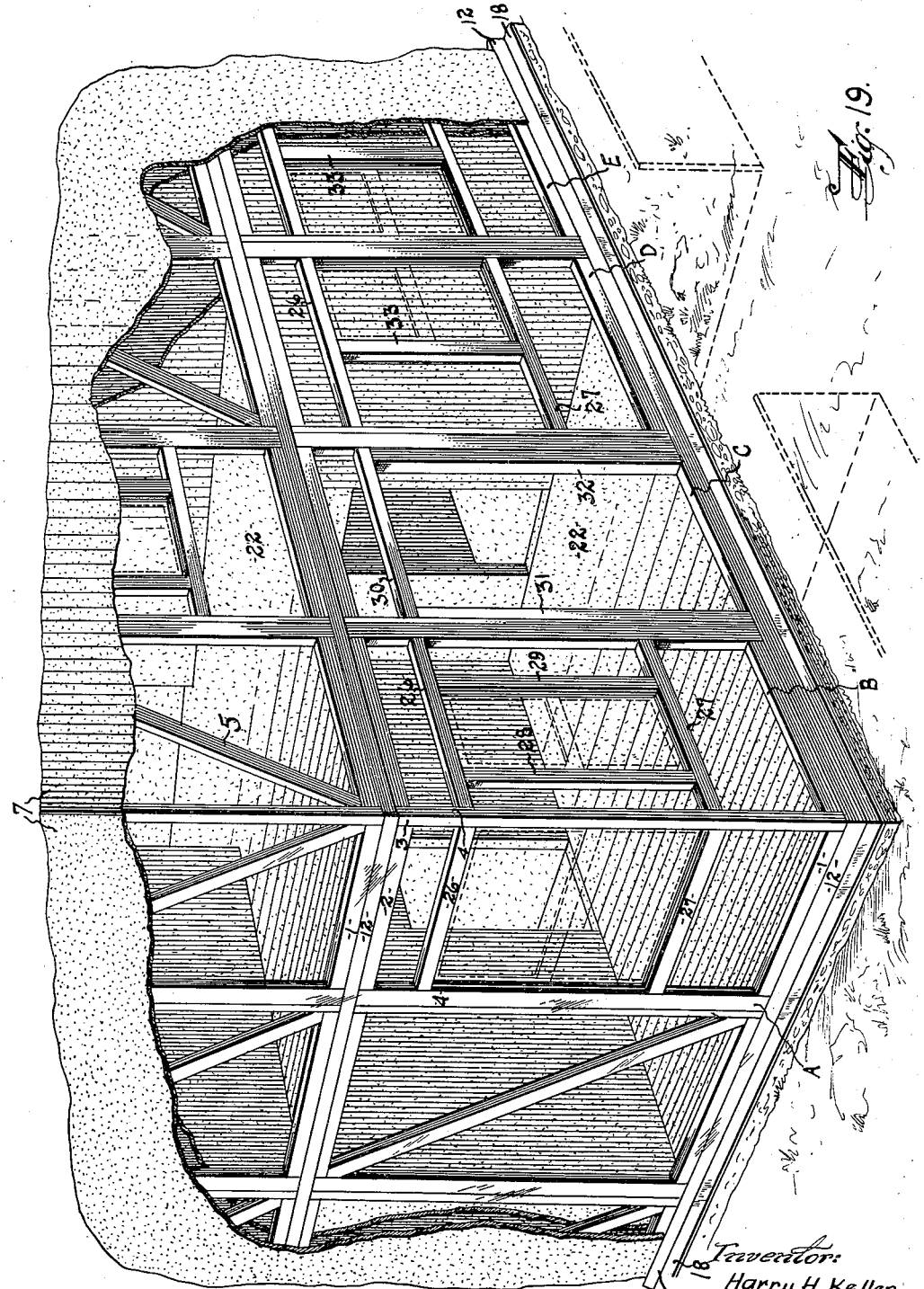

April 13, 1937.  H. H. KELLER  2,076,728
BUILDING STRUCTURE
Filed March 29, 1933  10 Sheets-Sheet 7
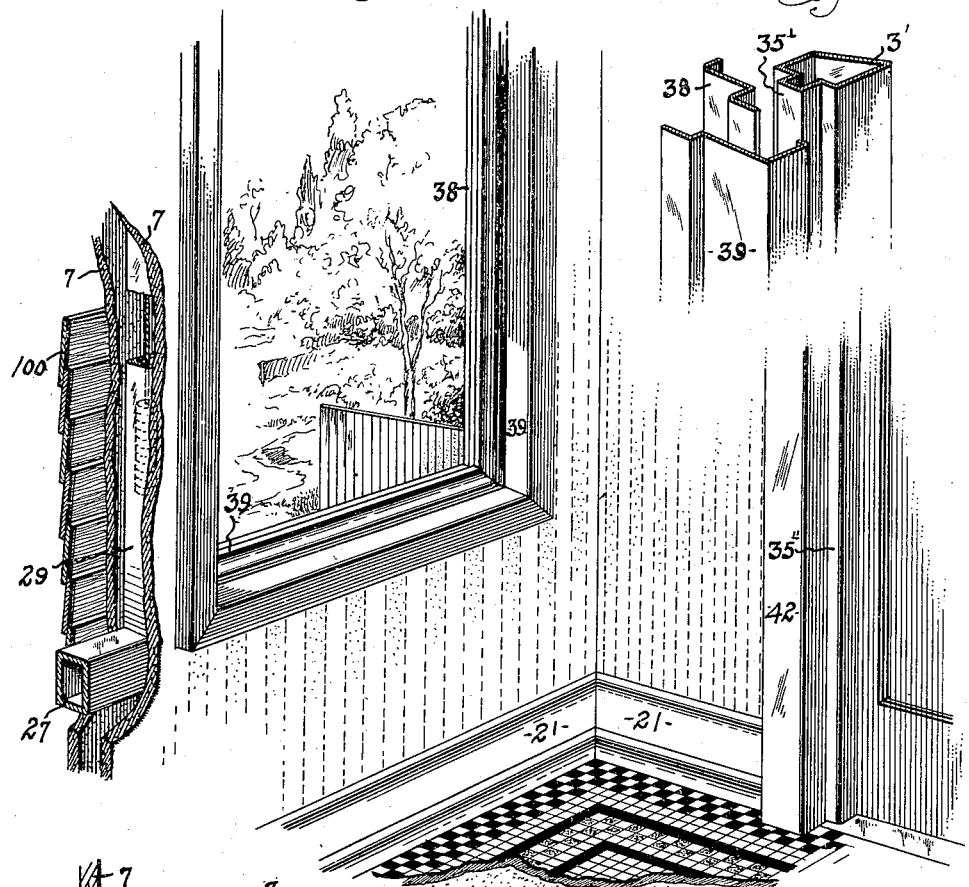
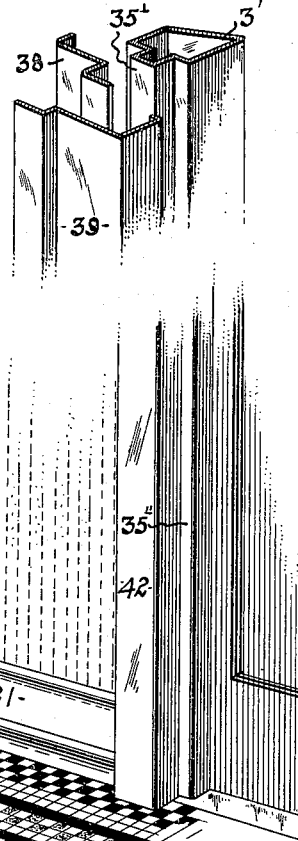
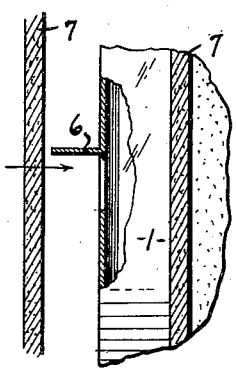
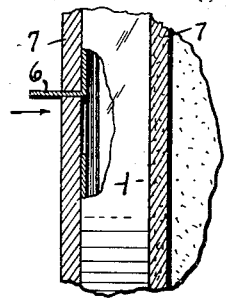
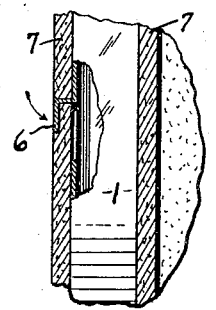
Inventor:
Harry H. Keller
BY Darby & Darby
Attorneys.

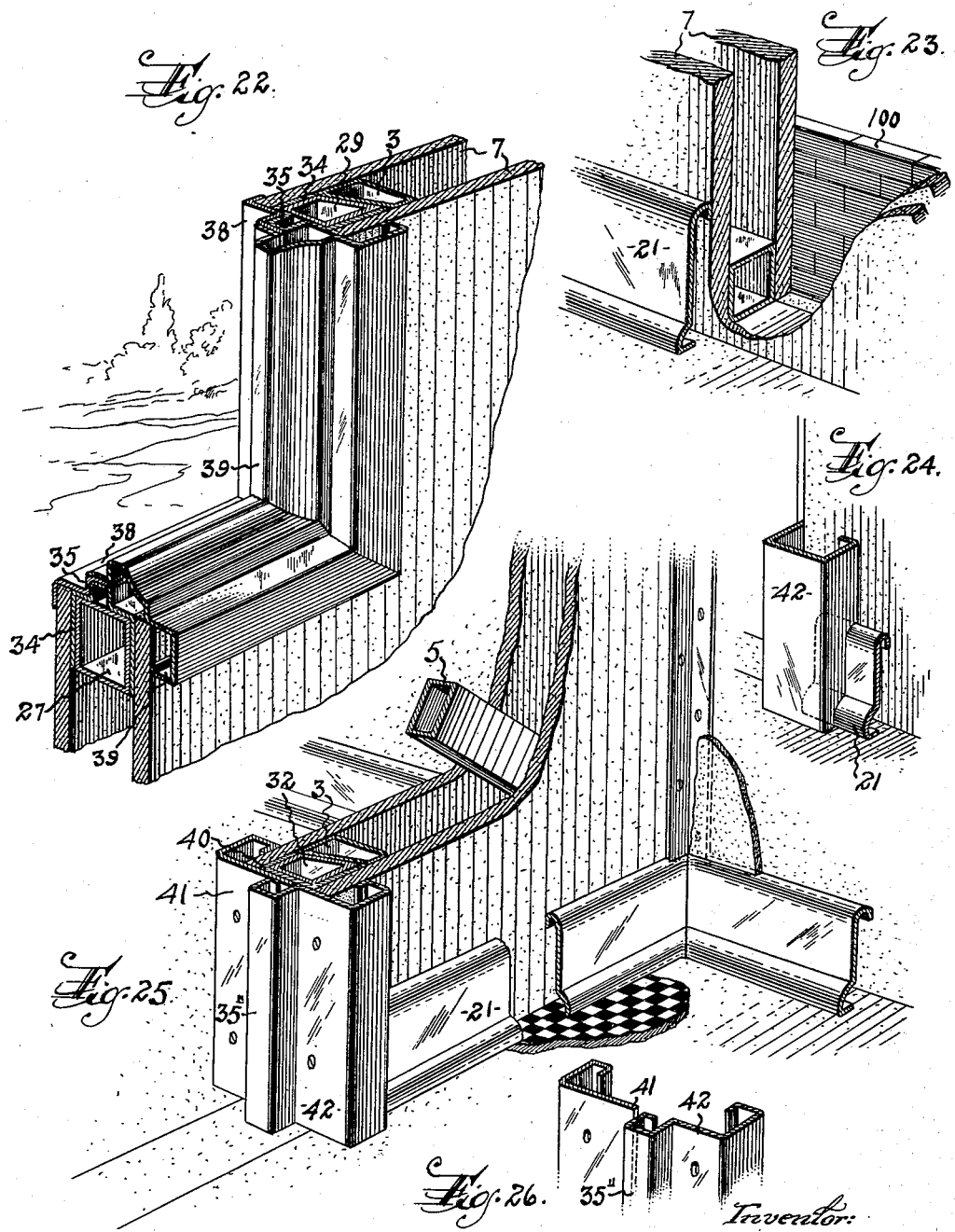

April 13, 1937.  H. H. KELLER  2,076,728
BUILDING STRUCTURE
Filed March 29, 1933   10 Sheets-Sheet 9
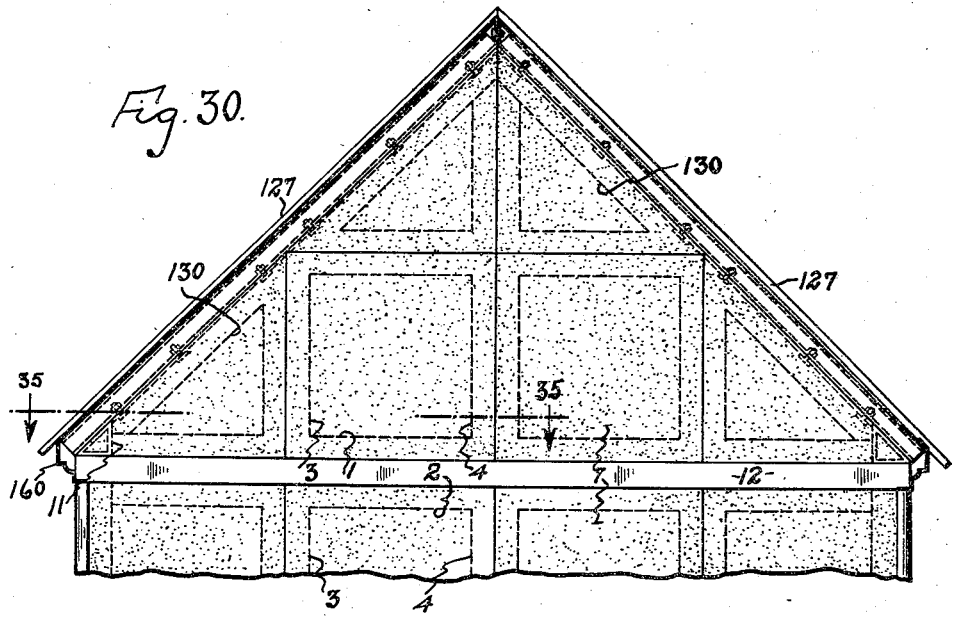
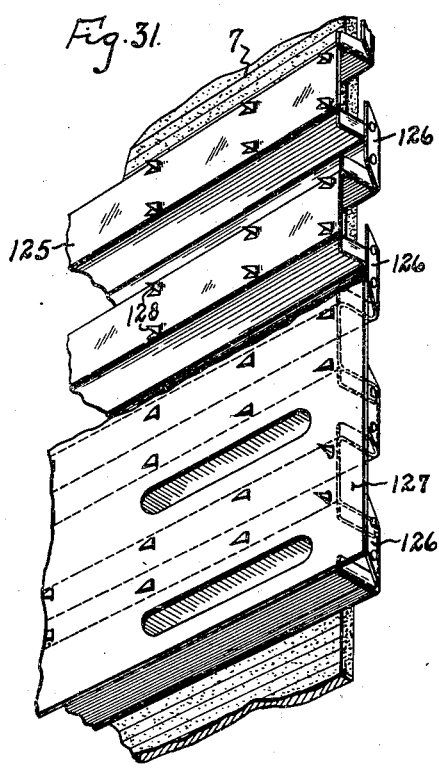
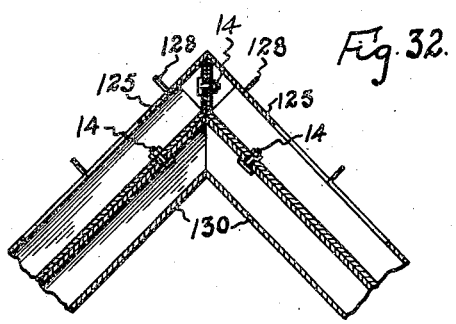
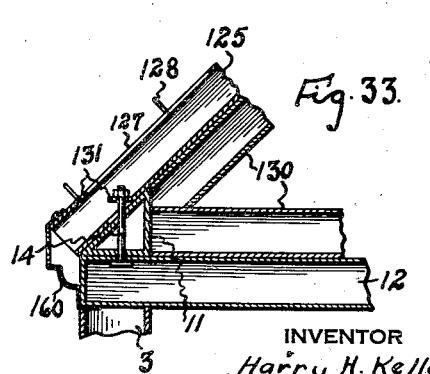
INVENTOR
Harry H. Keller
BY Darby & Darby
ATTORNEYS.

April 13, 1937. H. H. KELLER 2,076,728
BUILDING STRUCTURE
Filed March 29, 1933 10 Sheets-Sheet 10
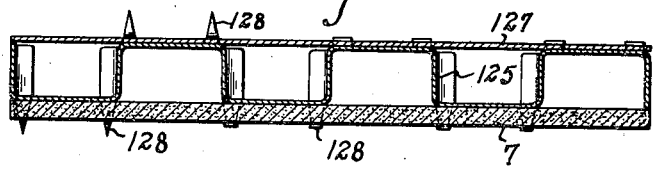
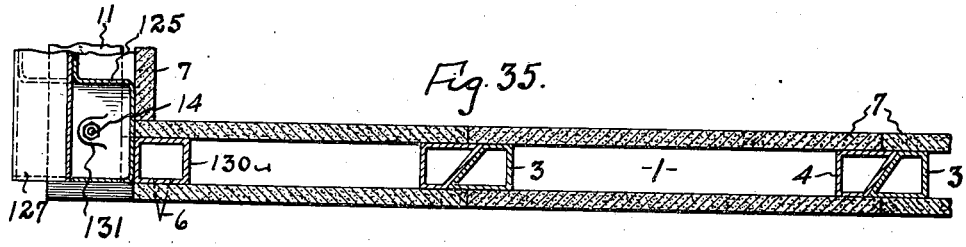
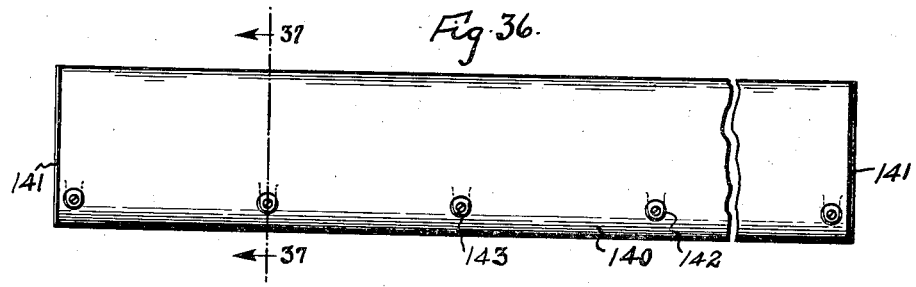
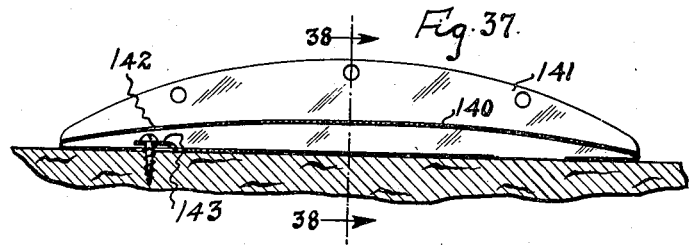
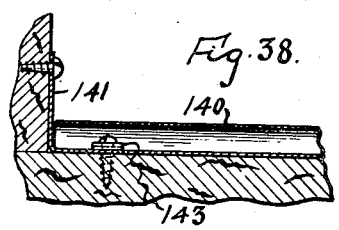
INVENTOR
*Harry H. Keller*
BY
ATTORNEYS Patented Apr. 13, 1937

2,076,728

UNITED STATES PATENT OFFICE 2,076,728

BUILDING STRUCTURE

Harry H. Keller, Ventnor, N. J., assignor to Bitting Incorporated, New York, N. Y., a corporation of Delaware Application March 29, 1933, Serial No. 663,284

21 Claims. (Cl. 189—34)

This invention is directed to improvements in building structures more particularly of the type built up from standardized construction units.

A general object of this invention is to provide a structure unit from which buildings of any suitable size and shape may be built up at low cost.

A further object of the invention is to provide a structural unit from which buildings, particularly of the residential type, may be constructed to meet conditions of low cost construction and the standards of taste ordinarily required by the home owner.

A further object of this invention is to provide a fabricated unit, assembled previously to delivery at the building site, to provide a simple structure which has all the requisites of strength.

A further object of this invention is to provide a structural unit of a minimum number of parts which may be easily and quickly assembled into structures of any desired shape and size.

A further object of this invention is to provide a structural unit of a minimum number of parts which may be added to other units to form partition walls with other types of construction (such as in buildings constructed in any present day manner).

A still further object of this invention is to provide a relatively few supplementary elements which, taken with the structural unit, will provide a building of any desirable shape.

A still further object of this invention is to provide a structural building unit which may be manufactured in accordance with modern machine methods and which is particularly adapted to quantity production at low cost.

A further object of this invention is to provide a floor and ceiling unit which combined with the side wall structural unit will, in conjunction with a few additional elements all easily secured together by simple bolts, provide a complete structure which is adapted at any time to enlargement in width, length and heighth.

These and many other objects as will appear from the following disclosure are successfully secured by means of this invention.

This invention resides substantially in the combination, construction, arrangement and relative location of parts all as will appear more fully hereinafter.

Referring to the drawings—

Figure 1 is a perspective view of one of the side structural units from which a building of any suitable size and shape may be built up by the proper assembly of a number of these units;

Fig. 2 is a perspective view of the fill-piece unit;

Fig. 3 is a perspective view of a stud by means of which partitions may be built out from the structural unit of Fig. 1;

Fig. 4 is a perspective view of a portion of the angle plate for finishing off the inside and outside corners of the building;

Fig. 5 is a perspective view of the bolt and nut by means of which the elements are assembled;

Fig. 6 is a perspective view of a portion of a structure assembled from the units of this invention showing the parts broken away and in section at many points to bring out the relative arrangement thereof;

Fig. 7 is a vertical cross-sectional view through the side wall in the plane of the floor showing the relationship of the elements at this point, between two floors;

Fig. 8 is a perspective view from the inside of one corner of a structure showing the foundation and the relationship of the parts between two floors;

Fig. 9 is a perspective view from the outside of one corner showing how the side units are assembled at a corner;

Fig. 10 is a horizontal cross-sectional view above the first floor showing a corner and a partition;

Fig. 11 is a top plane view of a portion of the floor unit showing its relationship with the side wall units, with the cover plate of the floor unit removed and some portions thereof broken away;

Fig. 12 is a view similar to Fig. 11 but a complete top plane with respect to the floor unit;

Fig. 13 is a perspective view of a portion of the floor unit with the cover plate removed;

Fig. 14 is a view similar to that of Fig. 11 with the cover plate attached but partly broken away;

Fig. 15 is a perspective view at a point where two side wall units and a partition unit come together;

Fig. 16 is a horizontal cross-sectional view through a corner looking down on the floor unit and showing the complete floor unit and flooring;

Fig. 17 is a horizontal cross-sectional view through a corner and an offset side wall;

Fig. 18 is a horizontal cross-sectional view through one of the end flanges of the floor unit showing its attachment to the fill-piece;

Fig. 19 is a perspective view of a structure assembled from the structural unit of Fig. 1 showing some of these units modified for permitting the mounting of doors and windows;

Fig. 20 is a perspective view looking into an inside corner of a finished room showing a window frame, a door frame and the base-board;

Fig. 21 is a perspective view of the elements from which the door frames are constructed;

Fig. 22 is a perspective detailed view of the window frame showing the parts in transverse section;

Fig. 23 is a perspective sectional view through a wall showing the outside covering for the building and the base-board.

Fig. 24 is a perspective detail view showing the joint at the base-board and door frame;

Fig. 25 is a perspective view looking into an inside corner adjacent a door frame showing some of the parts in cross-section, the door frame being in modified form;

Fig. 26 is a perspective view of a portion of the door framing;

Figs. 27, 28 and 29 illustrate the manner of applying the surface layer to the structural unit;

Fig. 30 is an outside end elevational view of a building showing a peaked roof and how it is formed in accordance with this invention;

Fig. 31 is a perspective view, with some parts broken away, of a portion of the roof section;

Fig. 32 is a vertical transverse cross-sectional view through the ridge of the roof showing how the roof sections are joined;

Fig. 33 is a vertical cross-sectional view through the structure where the side walls and roof come together;

Fig. 34 is a vertical cross-sectional view through a portion of the roof section;

Fig. 35 is a cross-sectional view taken on the line 35—35 of Fig. 30;

Fig. 36 is a top plan view of a door sill;

Fig. 37 is a cross-sectional view taken on the line 37—37 of Fig. 36; and

Fig. 38 is a cross-sectional view taken on the line 38—38 of Fig. 37.

The prime object of this invention is to provide improved structural units from which buildings and homes may be assembled at low cost to provide housing for the vast army of prospective home owners whose income places buildings and homes of the usual constructtion beyond their capacity. An important characteristic of the present invention resides in the fact that the units in accordance with this invention, from which buildings of any suitable size and shape may be constructed, are adapted to machine production and assembly at the factory from which they may be shipped to the building site for rapid assembly by unskilled labor. The side wall structural unit of this invention is complete both as to size and shape and is provided with a surface covering on both sides to provide both the outside and inside walls of the building which may be suitably covered or finished off to meet any desired artistic and decorative scheme. The floor and roof units are likewise complete and may or may not have the floor or roof covering attached thereto when shipped to the building site. The adjunct elements are few and when combined with the side wall structural units and the floor units provide a complete building which may then be decorated and finished off to suit the taste.

These relatively few and simple units are all assembled together by means of nuts and bolts and require a wrench as the only tool in assembling a building. In a broader sense these units may be secured together in any suitable manner, as by wiring, welding, and the like.

The structural units when built up from simple hollow forms are exceedingly strong and light and are of a nature which adapts them to rapid and inexpensive construction by modern machine methods in accordance with the requirements of modern quantity production. The simple forms from which the units are constructed may be made of any suitable metal such as steel, aluminum and the like, or may even be made of wood or plastic materials whether hollow or solid, without departure from the scope of this invention.

It should be noted that the struts and/or cross-braces for the side wall structural units may, in some cases, be dispensed with where the units are of sufficient strength without their use. For example, in the case of smaller units they might not be necessary, or the material of which the members forming the units may be made of such proportions as to make the units strong enough for the loads they are to carry without the use of struts and cross-bracing.

An important feature of this invention is that a structure may be built with a limited number of standardized units as to width and/or length, which structure may be of any desired style, size and shape.

The side wall units may be covered with any suitable covering material such as wall-board, veneer panels such as plywood, plaster-board, or manufactured lumber substitutes, metal lath to which plaster, stucco and the like, may be applied and, in fact, to any suitable covering material adaptable to the purpose.

The exact nature of the invention will be best understood by detailed reference to the drawings. A side wall structural unit is shown in Fig. 1 which, obviously, may be made in standard sizes which, experience demonstrates, are the best to provide structures as to size and shape as will be demanded. The unit is preferably in rectangular form and comprises the base piece 1, the top piece 2, and the side pieces or studs 3 and 4. These beams, or pieces, are made of formed sections, preferably rectangular in form, with the exception of the outer side walls of the studs 3 and 4 which extend at an angle preferably of 45°. Within the scope of this invention the joints between the units may be of other forms as long as the requirement of reversibility of the parts is met. These beams, or pieces, 1, 2, 3 and 4 are assembled together, as illustrated in Fig. 1 to form a rectangular frame which is cross-braced by means of a strut 5 which is likewise preferably of rectangular hollow form. All of these beams or pieces are secured together preferably by welding, in the case of metals, in accordance with standard practice. At suitable points along each side these pieces have struck-out integral tabs 6 which extend through the wall coverings 7, 7, and are bent down, as shown, to firmly secure the covering in place. At suitable points the pieces are provided with holes 8 and slots 9 in alignment. It is an important feature of this invention that the structural units thereof are symmetrical in form so as to be reversible in use. Wherever a hole 8 occurs in back of the wall covering a large hole is cut through the covering and the plug 10 which is thus formed is left therein so that it may be easily removed for the purpose of applying a nut to the bolt which projects through the hole 8. These plugs 10 are preferably reduced in thickness, as will be described later, to provide space for the nut. As thus described the side wall structural unit is complete and is assembled at the factory for shipment to the building site. It is to be understood that the wall-board covering 7 illustrated in the drawings is for purposes of illustration solely, since any suitable covering material may be employed. The studs 3 and 4 are shown with their inclined faces lying in parallel relation, but it is within the scope of this invention to have these side faces reversed so as to lie along converging lines in either direction.

The partition stud 11 of Fig. 3 is triangular in cross-section and is of the same type and material as used in studs 3 and 4, having suitably spaced holes therethrough for reception of the bolts, as will appear later, and tabs on one face to secure the surfacing material in place.

The fill-piece 12 shown in Fig. 2 consists of a rectangular hollow beam having the struck-out fastening tabs 6 by means of which the covering 7 is attached thereto. This beam likewise has holes and slots 9 so that it may be secured in place. The fill-pieces may be of various cross-sectional sizes as illustrated in the drawings to meet variations in details of construction.

The angle plate 13 is an ordinary angle bar and is provided with holes through which fastening means may be applied.

The floor unit is shown in Figs. 11 to 14 inclusive. This unit 20 consists of a flat plate formed into rectangular channels opening in opposite directions, as is clear from Fig. 13. The channels are provided with openings 24' which reduce the weight of the unit without materially reducing its strength. At suitable intervals along the upper ends of the channels the side walls thereof are provided with integral inturned flanges 24 having bolt holes 8 therethrough. A covering or surface plate 23 is secured to the top of the member 20 by welding, or other means, in the case of metal. This cover plate is provided with large openings 24ª to reduce the weight of the floor unit and to provide access to the interior thereof at the ends so that the bolts may be put in place. These large openings 24ª do not weaken the unit because its real strength resides in the channel section of the portion 20.

The bolt by means of which the parts are secured together is illustrated in Fig. 5. This bolt 14 is provided with a long narrow head 15 of such size that it will readily pass through the slots 9 in the various units. The shank of the bolt is of square cross-section, as shown at 16, adjacent the head so that when the bolt is passed through the slot 9 and the hole 8 in alignment therewith and then turned so that the head is at right angles to the longitudinal axis of the slot and when finally pulled all the way in the spuare portion 16 will hold the bolt against turning when the nut 17 for the bolt is applied.

The use of slots and holes may be varied as will be apparent at the various joints so that the bolts may be secured in place through the available openings through which access may be had in securing the bolts in place.

The units thus described are all that are necessary to complete the rough structure by bolting or otherwise securing them together in the proper relation. The additional units to be described later are in the nature of finishing off elements for completing the structure, Fig. 6 shows the manner of assembling the units thus described to provide a complete structure. While it is common practice to merely support a structure, and particularly a house, by resting it on the foundation there is shown in Fig. 6 a structure for actually securing the frame work to the foundation. This unit 18 comprises a plate which either rests on the top of the foundation or is secured thereto in accordance with well known practice. The plate is provided at spaced intervals with struck-out fingers which are bent over in parallel and spaced relation with respect to the plate. Fill-pieces like those of Fig. 2 are then applied to the plate. The lower wall of the fill-pieces is provided with slots through which the fingers 19 pass and when the fill-pieces are slid longitudinally they are locked to the plate 18, as is clear in Fig. 6. The sidewall structural units then rest on the fill-pieces and contact along their inclined side edges, as illustrated in Figs. 7 to 10 inclusive, 16 and 17. The floor unit then rests on the top of these side units and overlaps the top edges of the side units for about half their width, as illustrated in Figs. 6, 7 and 18. Resting on the remaining width of the top edges of the side units are the fill-pieces 12. The side units for the next floor then rest on the top of the fill-pieces and overlap onto the floor units. The first floor floor units may rest on the inner exposed edge of the plate 18 or a concrete, or the like, floor may be laid to form the usual cellar floor.

At a corner the side units come together to form a right angle as shown in Figs. 6, 8 and 9. The contacting side pieces 3 and 4 of the adjacent units are then bolted together by means of the bolts 14, as clearly illustrated in Fig. 16. The contacting faces of the side beams 3 and 4 may be normally bowed outwardly slightly so that when they are bolted together these faces contact under a sealing pressure to form a tight joint. In all cases the relationship of the bolt head with respect to the slot is clearly shown in Fig. 8 which likewise illustrates how the square shank 16 of the bolt is locked against turning in the slot. Figs. 6 and 15 show how the inclined edges of the studs 3 and 4 of adjacent units along the side wall meet and are bolted together. Figs. 7 and 18 clearly illustrate how the fill-pieces and floor units are bolted together, the bolts are passed through the holes in the flanges 24 and the holes in the fill-pieces by reaching through the openings 24ª in the cover plate of the floor unit. The floor unit between the first and second story is connected to the top member 2 of the first floor side unit and to the bottom member 1 of the second floor side unit by means of bolts 14 as illustrated in Fig. 7. These bolts may be applied by reaching through the openings in the cover plate of the floor unit as will be apparent. Fig. 14 shows the slots 9 through which the bolt heads can pass, which slots likewise occur in the cross-pieces 1 and 2. The floor unit itself is provided with holes 8, as shown in Fig. 13. Of course the side wall covering is already attached to the units so that the plugs 10 may be withdrawn in order that the nuts may be applied to the bolts. These plugs are then cemented in place, as is clearly illustrated in Fig. 18. When the parts are all assembled all of the framework on both the outside and inside will be smoothly enclosed within the outer covering 7.

An important feature of this construction is that the floor unit is secured at all sides to the framework thereby strengthening the entire structure and reducing bending moment on the floor by partial continuous girder action.

A partition may be run off as illustrated in Figs. 6, 10 and 15. The partitions are best taken off at a point where the vertical studs 3 and 4 of a side unit come together. This is accomplished merely by the addition of one of the triangular beams 11 so as to provide a surface for the inclined vertical edge of the first side unit of the partition. All four vertical beams are then secured together by means of a long bolt 14 like that shown in Fig. 5.

Fig. 17 shows how an offset may be provided. In the case of a small offset a special stud 25 is provided having a cross-section like one of the studs 3 or 4. Two triangular beams 11 are provided and all of the parts bolted together as illustrated in Fig. 17. If the offset is greater the space taken by the lower triangular beam 11 and the beam 25 may be replaced by a unit like that of Fig. 1 of the proper horizontal width.

The floor covering 22 is then applied over the cover plate so as to fit tightly up against the inner side wall covering 7 as illustrated in Fig. 8. A base-board 21, which is merely shown in general form for the purpose of Fig. 8, is then secured in place and the angle plates 13 are applied to finish off the corners and to seal them. As illustrated in Figs. 6, 9 and 10 the outer corners may then be sealed off with an angle plate 13, if necessary or desirable. The outer walls may then be covered with any suitable outer surfacing such as stucco, as indicated at 100 in Fig. 6, clap-boards as illustrated in Fig. 20, or bricks as illustrated in Fig. 23. It should be noted in Fig. 6 that one of the cross-braces 5 has been replaced by two tension rods, as distinguished from a beam, merely for the purpose of illustrating a possible variation of this member.

The inner wall covering 7 may come together along an edge, as illustrated at the lower lefthand corner of Fig. 10, or may overlap as indicated at the lower right-hand corner of Fig. 10. The under-surface of the floor unit is likewise provided with the covering 7 as illustrated in Figs. 7 and 8.

The modifications of the side units to permit the mounting of windows and doors are illustrated in Fig. 19. Thus units in which windows and doors are to be mounted are merely varied by removing the cross-brace 5 and putting in the necessary horizontal and vertical braces to provide for the door and window frames. Unit A in Fig. 19 is provided with suitable spaced transverse beams 26 and 27 which provide the bracing for the unit and the frame in which a wide window may be mounted. These members 26 and 27 are likewise hollow formed sections welded to the side studs 3 and 4 of the unit. In the case of a window narrower than the unit, as illustrated for the unit B, the transverse members 26 and 27 are connected by vertical members 28 and 29 spaced apart the proper distance to receive a window of the desired width. The members 28 and 29 are likewise of rectangular cross-section and hollow and are welded, in the case of metal, or otherwise secured to the transverse members 26 and 27. In the unit C which is to receive a door, a transverse member 30 of the proper height is secured in place and, if desired, the vertical studs 31 and 32 are secured in place to provide members upon which the door framing may be mounted as well as the door. For a window of double width the adjacent units D and E may be constructed as shown. They comprise the horizontal cross beams 26 and 27 and the vertical beams 33 all suitably secured together. Thus units which do not have window and door openings are provided with cross-braces as described before.

From the description thus far given it will be apparent that the rough structure may have any desired and suitable size and shape and may be provided with windows and doors as required.

The details of the finishing elements for the doors and windows will now be described.

As illustrated in Fig. 23 a preferable form of base-board 12 is formed, in the case of metal from a sheet shaped up to give the desired finish.

A suitable decorative window framing is illustrated in Fig. 22. It could be assumed that the window of unit B of Fig. 19 is illustrated in Fig. 22. The transverse members 26 and 27 and the vertical members 28 and 29 outline the window space and are either formed with a rectangular ridge on their inner faces or are enclosed with a substantially U-shaped member 34 having a longitudinal, rectangular ridge 35 as illustrated in Fig. 22. Where the U-shaped member having the ridge 35 is employed as a separate unit the window framing members 26, 27, 28 and 29 are of less width in order to accommodate this member. The window framing consists of a plate 38 formed, as shown, so as to overlie the outer covering 7 at one end and to overlie the rectangular ridge 35. Another plate 39, shaped as shown, overlies the ridge and overlaps the inner wall covering 7 to provide a finish as shown.

One form of decorative door framing is illustrated in Figs. 20 and 25. As in the case of the window the stud 32 is narrower than the stud 3 and is enclosed within a plate 40 which finishes off the door opening in conjunction with the covering surfaces 7. The plate 41 is secured around one side edge of the opening and the plate 42 having a longitudinal ridge 35'' is secured thereover. With this simple arrangement the door opening is finished off and any suitable door may then be hung therein. As shown in Fig. 24 the member 42 in the region of the baseboard 21 is cut away so that the end of the base-board may be slipped behind it eliminating the necessity of making a finished joint on the job.

Fig. 21 shows a modification which may be applied to both the doors and the windows. In this case the longitudinal rectangular ridge 35' instead of being formed on a special member such as the member 34 of Fig. 22 or on the door member 42 may be formed on the vertical stud 3' of one of the structural side units itself. The finishing members 38 and 39 may then be suitably shaped, as shown in Fig. 21, to cooperate with the stud 3' in this form. Of course the members 38 and 39 may be given any desired shape on their outer portions to permit of a wide variety of decoration and finish at the window and door openings.

This for of door frame construction provides for a spring action of the portion of the frame engaged by the door to provide a tight joint when the door is closed eliminating the necessity of weather stripping.

Figs. 27, 28 and 29 illustrate how the wall-board or covering 7 is applied to the various units which includes the under-surface of the floor unit. Wall-board is forced onto the upstanding tabs 6 as indicated in these figures and the tabs are then bent over to lock the wall-board in place. This same arrangement may be employed to attach the wall-board to the under-surface of the floor units to provide a ceiling. The cover plate 23 for the floor unit may be provided with these tabs so that after the floor unit is in place and the bolts attached the covering may be applied to the floor by means of these tabs. This rough floor or roof covering will, of course, then be overlaid with the final flooring surface which may be of any desired material, such as wood, linoleum or roofing material, and the like. As illustrated in Fig. 25, for example, the final floor covering extends under the baseboard to provide a finished job.

With regard to the windows, any suitable type of casement, of steel, wood, or the like, may be fitted directly into the frames as finished in accordance with the above description.

One form of roof structure in accordance with this invention will now be described. A peaked roof is illustrated in Fig. 30 but it will, of course, be apparent that a flat roof can be constructed in accordance with this invention. The roof structure may be built up from roof structural units somewhat similar to the floor structural units but varying in some details. As before, a sheet of material such as metal, for example, may be formed up into a series of parallel channels opening in opposite directions as illustrated at 125 in Fig. 31. Alternate channels are provided with integral flanges 126 bent up at an angle of 45° to the plane of the unit, which flanges will have openings therein through which securing bolts may be attached. A cover plate 127 is secured across the top of the channel member and attached to the flanges where they contact, as will be clear from Fig. 31, by welding, or fastened by some other suitable means. The cover plate is provided with a series of struck-out tabs 128 by means of which any suitable roof surfacing material may be attached thereto. The cover plate, as in the case of the floor unit, may be provided with openings to lighten the unit and to provide access to the interior thereof for the purpose of securing the units together. Triangular shaped end spaces formed between the roof and the side walls will be filled in with side structural units like those shown in Fig. 1, and the remaining triangular spaces will be filled in with triangular shaped side structural units 130. These units will be made up of members like those employed in the rectangular units secured together in the same manner and covered on either or both sides with a surface material secured thereto in any suitable manner such as by means of the tabs as illustrated in Fig. 1. The edges of the triangular units may form joints with the rectangular units by means of oblique faces as in the case of the rectangular units and as illustrated, for example, in Fig. 35. As shown in detail in Fig. 32 the roof sections are brought together at right angles with the inclined edges formed by the flanges 126 contacting and are bolted together by means of the bolts 14 which may be applied by riveting through the openings in the cover plates. These roof sections at the ends rest along the hypothenuses of the triangular sections and are bolted thereto by means of bolts 14. At the lower ends of the roof sections and extending parallel to the ridge of the roof are triangular members similar to those shown in Fig. 3 bolted to the tops of the rectangular side sections and to the fill-pieces 12 and secured to the roof sections, as illustrated in Fig. 33. The roof sections are provided at the proper points with a series of struckout flaps 131 through which the bolts pass so that the roof sections, the triangular members 11 and the fill-pieces 12 are all securely bolted together. A ceiling for the top floor made up of floor sections will be mounted on top of the side sections in a manner similar to that illustrated in connection with the first floor and as shown in the various figures. The under-surface of the roof sections may have a covering 7 applied thereto, as has been described in connection with the other units. A suitable cornice member formed of metal and illustrated at 160 may be secured along the sides at the lower edges of the roof sections to close off the ends thereof and to give a finished appearance to the structure. The angle of the flanges 126 may of course be varied to accommodate roofs of different slopes.

Figs. 36, 37 and 38 illustrate a suitable form of compressible or resilient door sill which may be of such proportions that a door in closing will slightly depress it to make an air-tight joint. The door sill may consist of a sheet of metal formed up into a flat tube shape as illustrated at 140 in these figures. This will provide a compressible flat tubular element which will form the door sill. The upper portion of the sill is provided with holes 142 in alignment with struck-up tabs 143 by means of which the unit may be fastened to the floor across a doorway. Side flanges 141 may be formed on the sill so that it may be secured to the sides of the door, as illustrated in Fig. 38. With this type of sill when the door closes the lower edge of it will brush across the top of the sill and compress it slightly to form a sort of weather stripping. Such a resilient door sill will also have the action of resiliently retarding the door as it closes and preventing it from slamming too hard. As shown in Fig. 37, only one edge of the substantially tubular member 140 is secured to the floor with screws, leaving the other edge free to move transversely of the tube as pressure is applied thereto.

From the above description it will be apparent that this invention resides in certain principles of constructure and assembly which may be embodied in other physical forms without departure from the scope thereof. I do not, therefore, desire to be strictly limited to the disclosure as given for purposes of illustration but rather to the scope of the appended claims.

What I seek to secure by United States Letters Patent is:

1. A fabricated structural unit comprising side, top and bottom members secured together to form an open portable frame, the entire outer faces of the side members being flat and lying at an oblique angle to the plane of the unit and surface covering attached to both sides of the unit, the covering extending beyond the sides of the unit.

2. A structural unit comprising side, top and bottom members secured together to form an open frame, the outer faces of the side members being flat and lying at an oblique angle to the plane of the unit and surface covering attached to both sides of the unit, the members of the unit having spaced holes and slots through which securing means may be passed.

3. A building structural unit comprising top, bottom and side members in the form of hollow metal beams welded together to form an open portable framework and a surface covering attached to both sides thereof, the outer faces of the side members being flat and lying at an oblique angle to the plane of the unit.

4. A building structural unit comprising top, bottom and side members in the form of hollow metal beams welded together to form an open portable framework and a surface covering attached to both sides thereof, the outer edge faces of the side members of said unit lying at an oblique angle to the plane of the unit.

5. A building unit comprising an open framework formed of metal, bottom, top and side members welded together, each of said members comprising a hollow formed section and each having a plurality of struck-out tabs, and a surface covering attached to both sides of the unit by means of said tabs passing therethrough.

6. A building unit comprising an open framework formed of metal, bottom, top and side members welded together each of said members comprising a hollow formed section and each having a plurality of struck-out tabs and a surface covering attached to both sides of the unit by means of said tabs, the members having a plurality of spaced holes and slots to receive securing means.

7. An assembled structural unit comprising an open portable framework of beams permanently secured together, at least one bracing member extending across the unit, the side members of the unit having flat, inclined faces and a surface covering attached to both sides thereof.

8. A structural unit as described comprising a substantially rectangular open framework made up of bottom, top and side members each comprising a hollow metal beam, at least one bracing member extending between the inner edges of the framework, all of the members of said unit having integral tabs and cover members secured to both sides of said unit with said tabs.

9. A structural unit as described comprising a substantially rectangular open framework made up of bottom, top and side members each comprising a hollow metal beam, at least one bracing member extending between the inner edges of the framework, all of the members of said unit having integral tabs and cover members secured to both sides of said unit with said tabs, the side members of the unit having faces lying at an angle of approximately 45 degrees with the plane of the unit, and a plurality of spaced holes and slots formed in said members.

10. A structural unit as described comprising a substantially rectangular open framework made up of bottom, top and side members each comprising a hollow metal beam, at least one bracing member extending between the inner edges of the framework, all of the members of said unit having integral tabs and cover members secured to both sides of said unit with said tabs, the side members of the unit having faces lying at an angle of approximately 45 degrees with the plane of the unit, and a plurality of spaced holes and slots formed in said members, the cover members having removable plugs opposite said holes.

11. A structural unit as described comprising a substantially rectangular frame made up of top, bottom and side members each of which comprises a formed hollow metal beam, the side edges of the unit lying at substantially 45 degrees to the plane of the unit, the members of the unit having a plurality of struck-out tabs and spaced holes and slots, and cover members secured to both sides of said unit by means of said tabs, said cover members having holes therethrough adjacent the holes in the members.

12. A structural building unit comprising a hollow metal beam having a plurality of spaced slots and holes through the walls thereof, and a cover member secured to one face thereof, the cover member being coextensive with the face of the beam to which it is attached.

13. A structural building unit comprising a hollow metal beam having a plurality of spaced slots and holes through the walls thereof, a plurality of tabs struck-out from the wall of said member, and a surface covering attached by means of said tabs.

14. An assembled structure of the type described composed of a plurality of substantially rectangular units, each unit having bottom, top and side members, the side members having their entire outer faces inclined to the plane of the units, and wall surfaces attached to the units, the units being secured together along their inclined edges.

15. An assembled structure as described comprising a plurality of side wall units, floor units and fill-piece units secured together at adjacent edges by means of bolts, all of said units having surface coverings permanently attached thereto, the side units having a surface covering on both sides.

16. A structural unit as described comprising a substantially rectangular frame made up of hollow metal beams secured together, the beams at the side edges having their entire faces inclined to the plane of the unit, transverse bracing members secured to said unit so as to form a window opening, and covering members for both sides of said unit formed to leave the window opening.

17. A structural building unit comprising an open portable framework formed of a plurality of hollow metal members secured together to form a rigid framework, the side members of the unit each having a single face lying at an angle to the plane of the unit.

18. A structural building unit comprising an open framework formed of a plurality of hollow metal members having walls of uniform thickness secured together to form a rigid portable framework, and a cross-bracing member extending diagonally of the framework.

19. A structural panel unit comprising an open frame formed of top, bottom and side members, each of said members being of hollow section having side walls of uniform thickness and a surface covering secured to both faces of the frame, both coverings at one side edge at opposite sides of the frame extending beyond the frame.

20. A structural panel unit comprising an open frame formed of top, bottom and side members, each of said members being of hollow section having side walls of uniform thickness and a surface covering secured to both faces of the frame, the outer faces of the side members being flat and lying at an oblique angle to the plane of the frame.

21. A structural panel unit comprising an open frame formed of top, bottom and side members, each of said members being of hollow section having side walls of uniform thickness and a surface covering secured to both faces of the frame, the outer faces of the side members being flat and lying at an oblique angle to the plane of the frame, and both coverings at one side edge at opposite sides of the frame extending beyond the frame.

HARRY H. KELLER.